United States Patent
Algiene et al.

(10) Patent No.: US 6,761,311 B1
(45) Date of Patent: Jul. 13, 2004

(54) SYSTEM AND METHODS FOR DISCLOSING TRANSACTION INFORMATION TO CUSTOMERS

(75) Inventors: Kenneth Algiene, Littleton, CO (US); Mark Thompson, Denver, CO (US)

(73) Assignee: First Data Corporation, Englewood, CO (US)

( * ) Notice: Subject to any disclaimer, the term of this patent is extended or adjusted under 35 U.S.C. 154(b) by 0 days.

(21) Appl. No.: 10/394,603

(22) Filed: Mar. 21, 2003

(51) Int. Cl.[7] .............................................. G06K 15/00

(52) U.S. Cl. ..................... 235/383; 235/379; 235/380

(58) Field of Search ................................. 235/379, 380, 235/381

(56) References Cited

U.S. PATENT DOCUMENTS 5,659,165 A * 8/1997 Jennings et al. ............ 235/379

OTHER PUBLICATIONS

Minami et al. (US 2002/0153415), International online automatic cash transaction system, Oct. 24, 2002.*

Barbara et al. (US 2002/0016769), Method and system for online payments, Feb. 7, 2002.*

* cited by examiner

*Primary Examiner*—Michael G. Lee
*Assistant Examiner*—Kimberly D. Nguyen
(74) *Attorney, Agent, or Firm*—Townsend and Townsend and Crew LLP

(57) ABSTRACT

A method of disclosing transaction information to customers includes receiving at a host computer system a file comprising processing information. The processing information comprises a plurality of transaction categories and fee information associated with each transaction category. The method also includes receiving a message from a point-of-sale device requesting the fee information associated with at least one particular transaction category relating to a transaction with a customer and sending from the host computer system an electronic message comprising the fee information. The method further comprises displaying transaction information relating to the electronic message at the point-of-sale device and providing the customer the opportunity to cancel the transaction. The transaction may involve an exchange between at least two different forms of value.

29 Claims, 2 Drawing Sheets

SYSTEM AND METHODS FOR DISCLOSING TRANSACTION INFORMATION TO CUSTOMERS

CROSS-REFERENCES TO RELATED APPLICATIONS

This application is related to Provisional U.S. Patent Application Serial No. 60/147,899, entitled, "INTEGRATED POINT OF SALE DEVICE", filed on Aug. 9, 1999, by Randy Templeton, et al., and to co-pending, commonly assigned U.S. patent application Ser. No. 09/634,901, entitled, "POINT OF SALE PAYMENT TERMINAL", filed on Aug. 9, 2000, by Randy Templeton, et al., and to co-pending, commonly assigned U.S. patent application Ser. No. 10/116,689; entitled, "SYSTEMS AND METHODS FOR PERFORMING TRANSACTIONS AT A POINT-OF-SALE DEVICE", filed on Apr. 3, 2002, by Earney Stoutenburg, et al., and to co-pending, commonly assigned U.S. patent application Ser. No. 10/116,733, entitled, "SYSTEMS AND METHODS FOR DEPLOYING A POINT-OF-SALE SYSTEM", filed on Apr. 3, 2002, by Earney Stoutenburg, et al., and to co-pending, commonly assigned U.S. patent application Ser. No. 10/116,686, entitled, "SYSTEMS AND METHODS FOR UTILIZING A POINT-OF-SALE SYSTEM", filed on Apr. 3, 2002, by Earney Stoutenburg, et al., and to co-pending, commonly assigned U.S. patent application Ser. No. 10/116,735, entitled, "SYSTEMS AND METHODS FOR CONFIGURING A POINT-OF-SALE SYSTEM", filed on Apr. 3, 2002, by Earney Stoutenburg, which applications are incorporated herein by reference in their entirety for all purposes.

BACKGROUND OF THE INVENTION

This invention relates generally to financial transactions. This invention relates more specifically to systems and methods for disclosing transaction fees and exchange rate information to customers prior to consummation of a financial transaction. For a variety of reasons, merchants, money transfer service providers, currency exchange service providers, and many others wish to disclose to their customers information relating to the fees and exchange rates associated with services each provides. For example, money transfer service providers may complete wire transfers of money, or other units of value, for their customers. In some cases, the funds are intended to be disbursed to the recipient in a currency or value unit other than that which the sender deposited. In return for providing the service, the money transfer service provider may charge its customers. Additionally, the provider may exchange the funds at an exchange rate different from the rate at which the provider acquired the funds. For example, the third party money transfer service provider might charge a fee for the wire transfer and also derive revenue from exchanging the value from one form to another. The wire transfer fee might be a flat fee, while the exchange rate revenue might be based on a difference between a wholesale exchange rate and a retail exchange rate. In both cases, the third party service provider may wish to disclose the fee and/or exchange rate information to customers prior to completion of transactions.

Exchange rates may fluctuate daily, hourly, or even more frequently in volatile economic conditions. It may not be practical to disseminate to all potential points of sale the exchange rates between all forms of value each time the rates change. Thus, systems and methods are needed for providing fee and exchange rate information to the customers at the point of sale prior consummation of transactions.

BRIEF SUMMARY OF THE INVENTION

Embodiments of the present invention thus provide a method of disclosing to customers transaction information. The method includes receiving at a host computer system a file comprising processing information. The processing information comprises a plurality of transaction categories and fee information associated with each transaction category. The method also includes receiving a message from a point-of-sale device requesting the fee information associated with at least one particular transaction category relating to a transaction with a customer and sending from the host computer system an electronic message comprising the fee information. The method also may include displaying transaction information relating to the electronic message at the point-of-sale device and providing the customer the opportunity to cancel the transaction. The transaction may involve an exchange between at least two different forms of value. In some embodiments, the transaction information comprises a fee. The processing information may include an exchange rate between the at least two different forms of value. The method may include receiving a message from a point-of-sale device requesting the exchange rate between the at least two different forms of value and sending from the host computer system an electronic message comprising the exchange rate. The transaction information may include the exchange rate. The transaction information also may include a message that funds are acquired at a first exchange rate and sold at a second exchange rate. The first exchange rate may be a wholesale exchange rate and the second exchange rate may be a retail exchange rate. The first exchange rate may be a published exchange rate, and the second exchange rate may be an offered exchange rate. The transaction may include a money order purchase, a money order redemption, a wire transfer, a merchandise purchase, or the like.

In other embodiments, a method of disclosing to customers transaction information relating to transactions includes receiving at a point-of-sale device transaction parameters relating to a transaction with a customer and transmitting from the point-of-sale device to a host computer a request for transaction information associated with the transaction. The method also includes receiving the transaction information and displaying the transaction information to the customer. The method also includes providing the customer an opportunity to complete or abort the transaction based on the transaction information. Other embodiments may include receiving an input to abort the transaction. Displaying the transaction information to the customer may include displaying an exchange rate based on the transaction parameters. The transaction information may include a notice that currency is purchased at wholesale and sold at retail. Providing the customer the opportunity to cancel the transaction may include displaying an accept icon, in which case the method may include receiving a selection from a customer. The method also may include timing out the transaction in the absence of a selection from a customer. The method also may include displaying a selection screen on the point-of-sale device relating to sending a notification to a recipient, receiving a selection from the customer, and transmitting a notification to the recipient.

In still other embodiments, a system for providing transaction information to customers includes a point-of-sale device and an interface between the point-of-sale device and an exchange rate database. The point-of-sale device is programmed to receive transaction parameters relating to a transaction with a customer, acquire exchange rate information from the exchange rate database based on the transaction parameters, display transaction information, and provide the customer an opportunity to abort the transaction. The transaction information may include the exchange rate. The transaction information may include a message that funds are acquired at a first exchange rate and sold at a second exchange rate. The first exchange rate may be a published exchange rate and the second exchange rate may be an offered exchange rate. Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components.

DETAILED DESCRIPTION OF THE INVENTION

Figure 1:
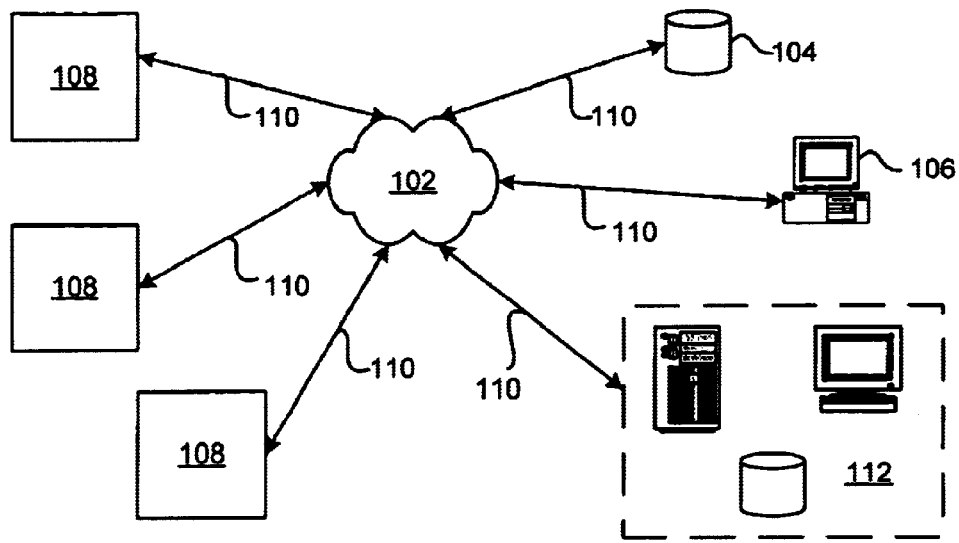
FIG. 1 illustrates a system for disclosing transaction information to customers according to embodiments of the present invention.

The present invention relates to systems and methods for disclosing to customers certain fee and exchange rate information associated with transactions. The present invention relates particularly to disclosing information associated with transections that involve a currency exchange, such as from U.S. dollars to a foreign currency; however, the invention is certainly not limited to such transactions. The present invention also relates to transactions where a customer is charged a fee relating to the transaction, and the service provider desires to disclose the fee to the customer prior to consummation of the transaction. Thus, herein "transaction" may refer to, but is not limited to, any of the following: currency exchanges; purchases or exchanges using credit cards, debit cards, or other value cards; wire transfers; a purchase or redemption of a money order or other negotiable instrument; a "value transfer" such as an exchange of airline miles for cell phone minutes (as further described in copending, commonly assigned U.S. patent application Ser. No. 09/955,747, which application is herein incorporated by reference in its entirety for all purposes); and the like. Herein, such transactions take place at a "point of sale," which may be, for example, a bank, a retail establishment, a multi-purpose kiosk (as further described in co-pending, commonly assigned U.S. patent application Ser. No. 10/225,410, which application is incorporated herein by reference in its entirety for all purposes), a service provider location, such as a Western Union office, and the like. A "point-of-sale device" may be used to facilitate the transaction. Such devices are more fully explained in previously-incorporated U.S. patent application Ser. No. 09/634,901, and include any interactive electronic device that may be used to facilitate transactions, as will be described. Herein, "provider" includes any entity that provides transaction services. Such entities include, but are not limited to, banks, retail merchants, third party money transfer service providers, and the like. Herein, "value" includes any asset form that may be expressed in units. For example, value includes, but is not limited to, all forms of currency, account credits, such as pre-paid long distance or cell phone time and movie rental credits, customer loyalty points, such as airline miles or hotel points, and the like.

According to embodiments of the present invention, a customer desirous to complete a transaction presents himself to a provider, thus initiating the transaction. For example, a person in the United States may wish to wire transfer money to someone in another country. The person/customer holds the money in U.S. funds, but wants the recipient to receive the funds in the currency of the country where the recipient is located. Thus, the customer initiates a wire transfer at a retail location that serves as an outlet for a wire transfer service provider. Such providers are well-known, one example of which is Western Union of Greenwood Village, Colo. The customer gives the provider transaction parameters necessary to complete the transaction, such as the amount of money to be transferred, some identifying information about the recipient, and the general location where the recipient will receive the funds. The provider enters information relating to the parameters into a point-of-sale device. Prior to completion of the transaction, the point-of-sale device displays transaction information relating to the fee or fees the customer will incur if the transaction is completed and/or the exchange rate or rates applicable to the transaction. For example, the customer may incur a wire transfer fee of $7.00 based on a $750.00 transfer and an exchange rate of 1:0.945 between the two forms of currency (these figures being completely hypothetical). The customer is then provided the opportunity to accept or abort the transaction.

Continuing with this example, the wire transfer fee may be based exclusively on the value of the transaction, in this case, $1.00 for every $100.00 transferred. The exchange rate may be based on the relative value between the forms of currency. Because currency is a commodity, different buyers and sellers of a particular currency may value the currency differently. Thus, determining an exchange rate spread for the transaction may be elusive. In some embodiments, the exchange rate is an offered exchange rate, representing the rate at which the provider is offering to "sell" units of the currency. It may be the case that the provider acquired the currency at a lesser rate, such as a wholesale rate. Thus, the offered exchange rate may be a "retail" exchange rate. In any of these cases, the provider may wish to disclose the wholesale rate, as well as, the retail, or offered, exchange rate. In yet other embodiments, the wholesale exchange rate cannot be calculated in a meaningful way, in which case, instead of a specific disclosure, the customer may be presented with a message stating that the provider makes money when it purchases currency at wholesale and sells it at retail, or something similar. In either of the aforementioned embodiments, the customer thereafter may be given the opportunity to abort the transaction. Other examples of disclosing exchange rates are possible.

Having described embodiments of the present invention generally, attention is directed to FIG. 1, which illustrates a system 100 for providing transaction information to customers. It is to be understood that the system 100 is presented for illustrative purposes only and many other embodiments and equivalents are apparent to those skilled in the art in light of the disclosure herein. The system 100 includes a network 102, an exchange rate database 104, and an exchange rate computer 106. The network 102 may be any of a wide variety of network configurations, such as, for example, an intranet or a portion of the Internet. The network 102 may be, for example, a local area network (LAN), a wide area network (WAN), or the like. The exchange rate database 104 may be any of a wide variety of storage devices, including, for example, magnetic storage systems, such as tape or disk, optical storage systems, such as CD or DVD systems, and solid state systems, such as RAM or ROM, and the like. The exchange rate computer 106 may be any of a wide variety of well-known computing devices, including, for example, a personal computer, a workstation, a mainframe, a server, and the like. The exchange rate database 104 and the exchange rate computer 106 may be located apart from one another, as shown, or co-located. In fact, the exchange rate database 104 and the exchange rate computer 106 may be provided as a single hardware item. In either case, other computers (not shown) in the system 100 also may function as the exchange rate computer 106. Many additional computing and data collection platforms (not shown) may be connected with the system 100 and/or be comprised by portions of it. For example, computers and databases may collect, store, and process transactions relating to activity for which transaction information is disclosed. Such platforms are more fully described in previously incorporated U.S. patent application Ser. No. 10/116,689.

The system 100 also includes one or more point-of-sale devices 108. Point-of-sale devices are more fully explained in previously-incorporated U.S. patent application Ser. No. 09/634,901. Using a point-of-sale device 108, a transaction service provider may enable a customer to accomplish any of a wide variety of financial transactions. Such transactions include, but are not limited to, the following: purchases or exchanges using credit cards, debit cards, or other value cards; exchanges among various forms of value, such as currency and loyalty points; value transfers, such as a "wire transfer" of money, including transfers that involve an exchange between currency forms; purchases and exchanges of negotiable instruments, such as money orders, including such transfers that involve an exchange between currency forms; and the like. Interfaces 110 interconnect the network 102 and the point-of-sale devices 108, the exchange rate database 104, and the exchange rate computer 106. The interfaces 110 are simply wired or wireless transmission links providing the various system components the ability to transmit information.

The system 100 also may include a host computer system 112. The host computer system 112 may include, for example, server computers, personal computers, workstations, web servers, and/or other suitable computing devices. The host computer system 112 includes application software that programs the host computer system 112 to perform one or more functions according to the present invention. The host computer system 112 may include one or more of the aforementioned computing devices, as well as storage devices such as databases, disk drives, optical drives, and the like. The storage devices may include solid state memory, such as RAM, ROM, PROM, and the like, magnetic memory, such as disc drives, tape storage, and the like, and/or optical memory, such as DVD. The host computer system 112 may be fully located within a single facility or distributed geographically, in which case a network may be used to integrate the host computer system 112.

Figure 2:
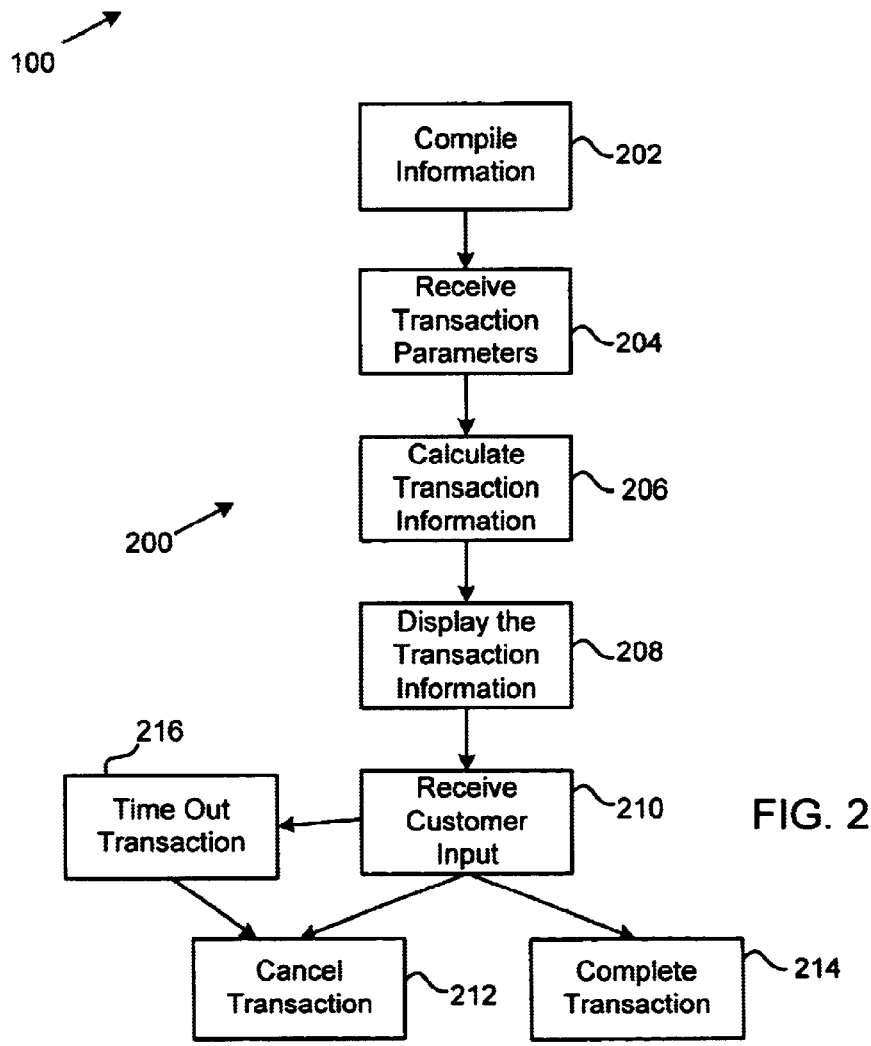
FIG. 2 illustrates a method of disclosing transaction information to customers according to embodiments of the present invention.

Having described the general configuration for an exemplary, non-limiting system for providing transaction information to customers, a method 200 of providing transaction according to the present invention will be described with reference to FIG. 2. The method 200 may be implemented in the system 100 of FIG. 1. According to the method 200, information is compiled at step 202. Compiling information may include establishing fees and exchange rates for transactions that may be performed by any of the aforementioned providers. In some cases, the fees may be a flat fees, independent of the transaction amount. For example, if a provider wishes to charge $2.50 for a money order, then compiling the information would include establishing a transaction category of "money order" and assigning a fee of $2.50 to the money order transaction category. On the other hand, for variable fee transactions, further considerations are necessary.

If a provider wishes to establish a variable fee for a transaction, for instance, $1.00 per $100.00 for a wire transfer, then compiling information at step 202 would include establishing a variable transaction category. In some cases, such as the wire transfer fee, at step 202, the provider would simple enter $1.00 per $100.00 as the fee associated with a wire transfer. In some embodiments, this would result in an incremental $1.00 fee based on the number of whole $100.00 increments. However, if the provider wishes to charge 1%, then the fee portion of the information might include "1%," in which case a $250.00 transaction would result in a fee of $2.50, instead of $2.00, as would be the case in the $1.00 per $100.00 example. In still other embodiments, the fee may be a variable fee, such a "2% up to $50.00, then 0.5% thereafter." Many other examples are possible, and those skilled in the art will realize how to implement such fee schedules so that the information may be used meaningfully according to the present invention.

In yet other embodiments, compiling the information may be more complicated, such as would be the case for exchanges between different forms of currency or other forms of value. As explained previously, currency is a commodity, and different buyers and sellers of a particular form of currency value it differently. Thus, a provider may be updating regularly the information associated with various exchange rates. For example, a provider may wish to offer customers transactions that include an exchange of currency between U.S. dollars (USD) and Euro dollars. The information may include an offered exchange rate for exchanging U.S. dollars into Euro dollars. The offered exchange rate may be a "retail" exchange rate. In either case, the offered exchange rate is the rate at which the provider is "selling" Euro dollars. Additionally, the information might include a "wholesale" exchange rate between U.S. dollars and Euro dollars. The wholesale exchange rate may be the rate at which the provider most recently acquired Euro dollars. In some embodiments, the wholesale exchange rate is a published exchange rate, representing an exchange rate published by a well-known financial information source such as the *Wall Street Journal* or *Bloomberg*, which may represent the exchange rate from the previous day market close. In yet other embodiments, no wholesale exchange rate is included.

The information may be compiled at a computer, such as the exchange rate computer 106, or other computing device, and saved at the exchange rate database 104. Thus, the information may be accessed by point-of-sale devices 108 throughout the system 100.

At operation 204, transaction parameters are received at a point-of-sale device. Transaction parameters may include, for example, the type of transaction, the amount of the transaction, the various forms of value involved in the transaction, a recipient, as would be the case for a wire transfer, and the like. The transaction parameters may be received by a clerk associated with a provider and entered into the point-of-sale device. In other embodiments, the information is received by the point-of-sale device directly from the customer. Other examples are possible. Also at step 204, the point-of-sale device communicates with the exchange rate database to obtain fee and exchange rate information.

At operation 206, any transaction information relating to the transaction is calculated. This may include, for example, calculating a fee based on a variable fee schedule as discussed previously with respect to operation 202. Additionally, operation 206 includes determining the number of units of the target currency the recipient will receive. This may be based on the retail exchange rate, as previously discussed.

At operation 208, the transaction information is presented to the customer. The transaction information may be displayed on a point-of-sale device. In some embodiments, the transaction information may be printed on a receipt and provided to the customer in print. The transaction information may include any fee associated with the transaction, including flat fees and variable fees. Additionally, the transaction information may include any exchange rates applicable to the transaction. In addition to the offered exchange rate, the wholesale exchange rate may be included. As previously discussed, the wholesale exchange rate may be the exchange rate at which the provider last acquired the currency. In other embodiments, the wholesale rate may be the exchange rate the provider is offering for the reverse transaction. In still other embodiments, only the offered exchange rate is provided. In such embodiments, the transaction information presented to the customer may include a message that the provider purchases currency at wholesale and offers currency at retail, so the like. In any of the above embodiments, operation 208 also includes providing the customer the opportunity to abort the transaction. Providing the customer an opportunity to abort the transaction may include displaying a selection screen on the point-of-sale device. The selection screen may include icons or buttons that the customer selects to input his decision. The buttons may be mechanical buttons or electronic buttons, such as may be displayed on a touch screen, as is known in the art.

At operation 210, the customer's input to either accept or abort the transaction is received. This may be accomplished, for example, by the customer selecting an icon or pushing a button. In some embodiments, the selection is entered by an agent of the provider when the customer verbally or otherwise indicates his selection. Depending on the input, the transaction is either canceled at operation 212, or completed at operation 214. The transaction also may be canceled in the absence of a selection from a customer when the POS "times out" waiting for a selection as indicated by operation 216. Completing the transaction may involve many of the aforementioned processes or others known to those skilled in the art.

Figure 3:
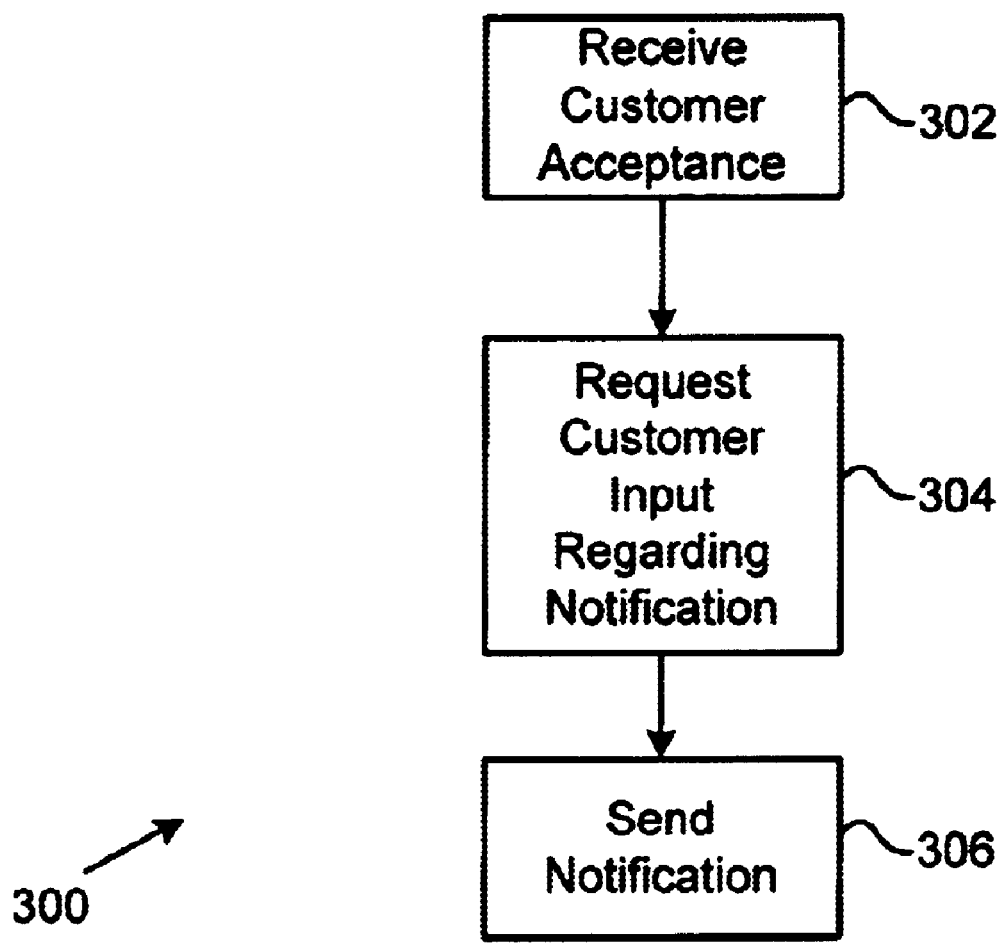
FIG. 3 illustrates a method of notifying a recipient according to embodiments of the present invention.

Attention is directed to FIG. 3, which illustrates a method 300 of notifying a recipient according to embodiments of the present invention. The method 300 may begin, for example, after operation 210 of method 200. Once a sender accepts a transaction at operation 302 (which may be operation 210), at operation 304 the POS displays a selection screen relating to sending a recipient notification. The selection screen may ask the customer if he desires to send a recipient notification. The selection may ask if the customer wishes to send the notification by telephone, email, message generator, or by other means. The selection screen may ask if the customer desires to send a notification by means previously used by the sender to notify the recipient This may involve the POS accessing a host computer system to obtain information on how the sender previously notified the recipient. Other examples are possible. At operation 306, a notification is sent according to the sender's instructions.

Having described several embodiments, it will be recognized by those of skill in the art that various modifications, alternative constructions, and equivalents may be used without departing from the spirit of the invention. Additionally, a number of well known processes and elements have not been described in order to avoid unnecessarily obscuring the present invention. For example, those skilled in the art know how to arrange computers into a network and enable communication among the computers. Additionally, those of skill in the art will realize that the present invention is not limited to presenting financial statements relating to the use of credit services. For example, the present invention may be used to present utility bills, phone bills, mortgage statements, brokerage account statements, and the like. Accordingly, the above description should not be taken as limiting the scope of the invention, which is defined in the following claims.

What is claimed is:

1. A method of disclosing to customers transaction information, the method comprising:

receiving at a host computer system a file comprising processing information, wherein the processing information comprises a plurality of transaction categories and fee information associated with each transaction category;

receiving a message from a point-of-sale device requesting the fee information associated with at least one particular transaction category relating to a transaction with a customer;

sending from the host computer system an electronic message comprising the fee information;

displaying transaction information relating to the electronic message at the point-of-sale device; and providing the customer an opportunity to cancel the transaction;

wherein the transaction involves an exchange between at least two different forms of value, and wherein the transaction information comprises a message notifying the customer that funds are acquired at a first exchange rate and sold at a second exchange rate.

2. The method of claim 1, wherein the transaction information comprises a fee.

3. The method of claim 1, wherein the processing information further comprises an exchange rate between the at least two different forms of value.

4. The method of claim 3, further comprising:

receiving a message from a point-of-sale device requesting the exchange rate between the at least two different forms of value; and sending from the host computer system an electronic message comprising the exchange rate.

5. The method of claim 4, wherein the transaction information further comprises the exchange rate.

6. The method of claim 4, wherein the first exchange rate is a wholesale exchange rate and the second exchange rate is a retail exchange rate.

7. The method of claim 4, wherein the first exchange rate is a published exchange rate, and the second exchange rate is an offered exchange rate.

8. The method of claim 1, wherein the transaction comprises a money order purchase.

9. The method of claim 1, wherein the transaction comprises a money order redemption.

10. The method of claim 1, wherein the transaction comprises a wire transfer.

11. The method of claim 1, wherein the transaction comprises a merchandise purchase.

12. A method of disclosing to customers transaction information relating to transactions, the method comprising:

receiving at a host computer system a file comprising processing information, wherein the processing information comprises an exchange rate between each pair of a plurality of value forms;

receiving a message from a point-of-sale device requesting the exchange rate between two particular value forms relating to a transaction with a customer; and sending from the host computer system an electronic message comprising the exchange rate;

displaying transaction information at the point-of-sale device, wherein the transaction information comprises a message notifying the customer that funds are acquired at a first exchange rate and sold at a second exchange rate; and providing the customer the opportunity to cancel the transaction.

13. The method of claim 12, wherein the transaction information further comprises the exchange rate.

14. The method of claim 12, wherein the first exchange rate is a wholesale exchange rate and the second exchange rate is a retail exchange rate.

15. The method of claim 12, wherein the first exchange rate is a published exchange rate, and the second exchange rate is an offered exchange rate.

16. The method of claim 12, wherein the transaction comprises a money order redemption.

17. The method of claim 12, wherein the transaction comprises a wire transfer.

18. The method of claim 12, wherein the transaction comprises a merchandise purchase.

19. A method of disclosing to customers transaction information relating to transactions, the method comprising:

receiving at a point-of-sale device transaction parameters relating to a transaction with a customer;

transmitting from the point-of-sale device to a host computer a request for transaction information associated with the transaction;

receiving the transaction information;

displaying the transaction information to the customer, wherein the transaction information comprises a message notifying the customer that funds are acquired at a first exchange rate and sold at a second exchange rate;

providing the customer an opportunity to complete or abort the transaction based on the transaction information.

20. The method of claim 19, further comprising receiving an input to abort the transaction.

21. The method of claim 19, wherein displaying the transaction information to the customer comprises displaying an exchange rate based on the transaction parameters.

22. The method of claim 19, wherein the transaction information comprises a notice that currency is purchased at wholesale and sold at retail.

23. The method of claim 19, wherein providing the customer the opportunity to cancel the transaction comprises displaying an accept icon, the method further comprising receiving a selection from a customer.

24. The method of claim 19, wherein providing the customer the opportunity to cancel the transaction comprises displaying an accept icon, the method further comprising timing out the transaction in the absence a selection from a customer.

25. The method of claim 19, further comprising:

displaying a selection screen on the point-of-sale device relating to sending a notification to a recipient;

receiving a selection from the customer; and transmitting a notification to the recipient.

26. A method of transferring money, comprising:

receiving at a point-of-sale device transaction parameters relating to a transaction with a customer;

displaying exchange the information relating to the transaction; and displaying information that permits a customer to either accept or decline the transaction;

wherein the transaction involves an exchange between at least two different forms of value, wherein the information that permits the customer to either accept or decline the transaction comprises a message notifying the customer that funds are acquired at a first exchange rate and sold at a second exchange rate.

27. The method of claim 26, wherein the information that permits a customer to either accept or decline the transaction comprises displaying at least an accept icon on a display screen.

28. The method of claim 27, wherein the display screen is a touch screen.

29. The method of claim 26, further comprising receiving a selection from a customer.

* * * * *